United States Patent
Döbler

(10) Patent No.: US 8,409,489 B2
(45) Date of Patent: Apr. 2, 2013

(54) INSERTION PLUNGER AND METHOD FOR INSERTING WRAP-AROUND LABELS AND CONTAINER BOTTOM LABELS INTO AN INJECTION MOLD

(75) Inventor: Daniel Döbler, St. Johann (DE)

(73) Assignee: Marbach moulds & automation GmbH, Bad Urach (DE)

( * ) Notice: Subject to any disclaimer, the term of this patent is extended or adjusted under 35 U.S.C. 154(b) by 0 days.

(21) Appl. No.: 12/965,842

(22) Filed: Dec. 11, 2010

(65) Prior Publication Data
US 2011/0140313 A1 Jun. 16, 2011

(30) Foreign Application Priority Data
Dec. 11, 2009 (DE) .......................... 10 2009 059 039

(51) Int. Cl.
*B29C 45/14* (2006.01)
(52) U.S. Cl. ........ 264/510; 264/512; 264/516; 425/545; 425/504
(58) Field of Classification Search .......... 264/510–512, 264/516, 545; 425/504, 522, 533
See application file for complete search history.

(56) References Cited

U.S. PATENT DOCUMENTS

| | | | | |
|---|---|---|---|---|
| 3,555,652 A | * | 1/1971 | Ignell | 156/500 |
| 3,984,511 A | * | 10/1976 | Lammers | 264/45.4 |
| 4,304,542 A | * | 12/1981 | Sauer | 425/523 |
| 4,323,411 A | * | 4/1982 | Uhlig | 156/245 |
| 4,818,213 A | * | 4/1989 | Roy | 425/533 |
| 5,043,130 A | * | 8/1991 | Fujio | 264/509 |
| 5,053,101 A | | 10/1991 | Dromigny | |
| 5,188,787 A | * | 2/1993 | King et al. | 264/153 |
| 5,489,360 A | * | 2/1996 | Shimizu et al. | 156/542 |
| 5,908,590 A | * | 6/1999 | Yoshimi et al. | 264/45.4 |
| 5,919,414 A | * | 7/1999 | Dobler | 264/511 |
| 6,083,434 A | * | 7/2000 | Strebel | 264/45.7 |
| 7,771,190 B2 | * | 8/2010 | Jenko | 425/564 |
| 2003/0214077 A1 | * | 11/2003 | Unterlander et al. | 264/328.8 |

FOREIGN PATENT DOCUMENTS

| | | |
|---|---|---|
| EP | 0519142 B1 | 12/1992 |
| JP | 2003340876 A | 12/2003 |
| JP | 2006056559 A | 3/2006 |

* cited by examiner

*Primary Examiner* — Joseph Del Sole
*Assistant Examiner* — Nahida Sultana
(74) *Attorney, Agent, or Firm* — Gudrun E. Huckett

(57) ABSTRACT

An insertion plunger for inserting at least one wrap-around label and at least one bottom label into an injection mold for producing a plastic container has an outer plunger and an inner plunger that is movable relative to the outer plunger. In a method for insertion of a wrap-around label and a bottom label into an injection mold, the labels are inserted by an insertion plunger in that the wrap-around label and the bottom label are inserted in a single stroke performed by the insertion plunger into the injection mold.

3 Claims, 4 Drawing Sheets

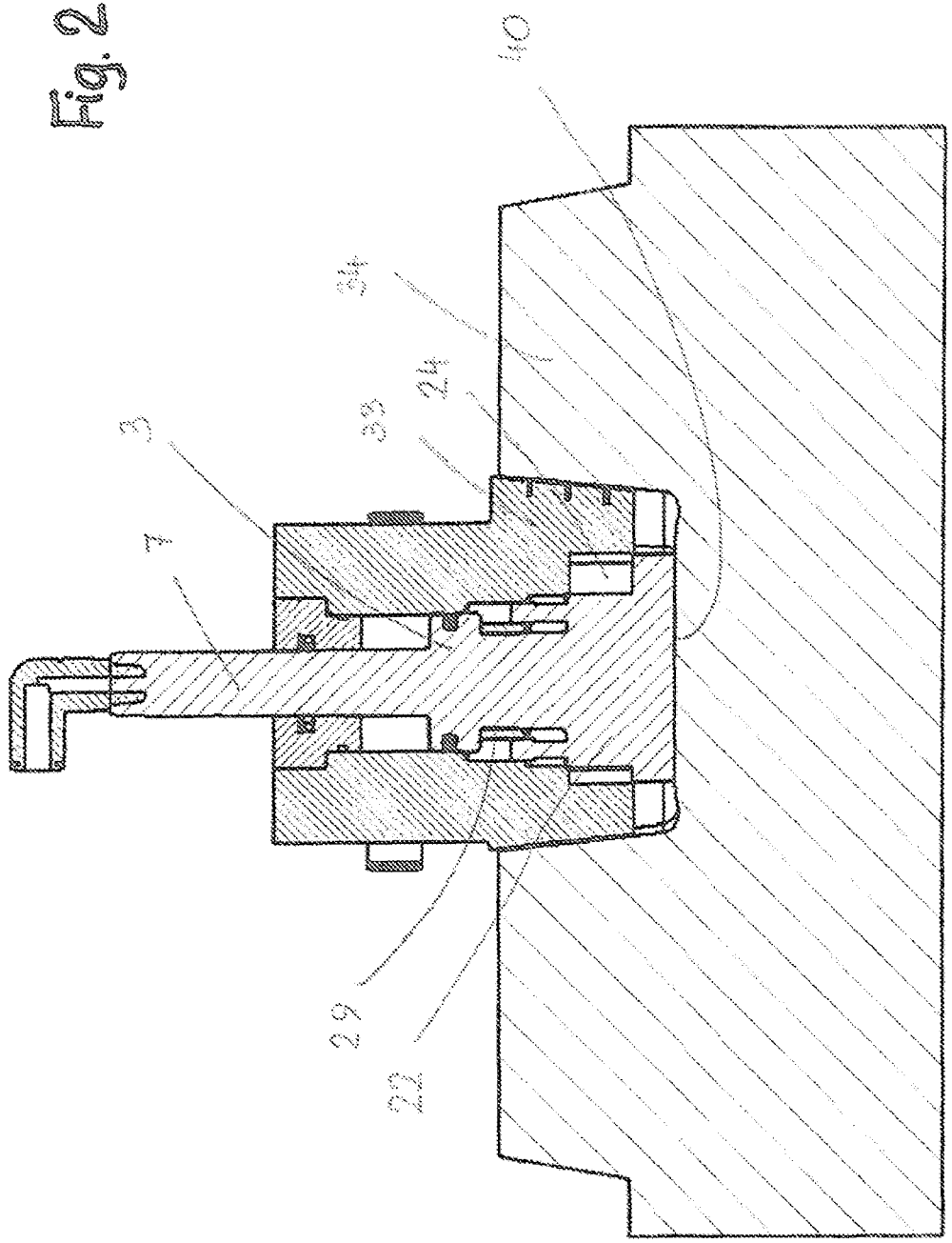

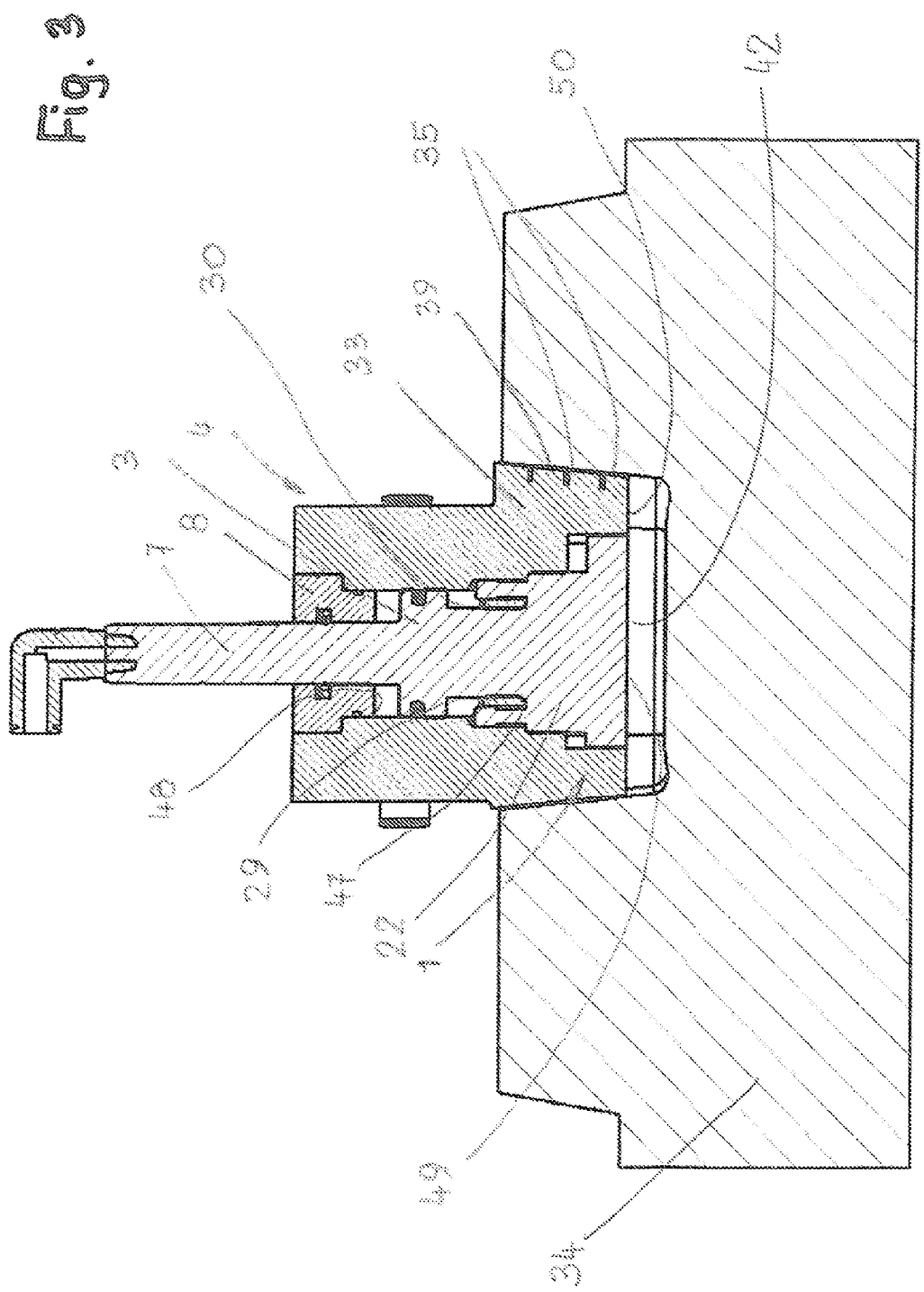

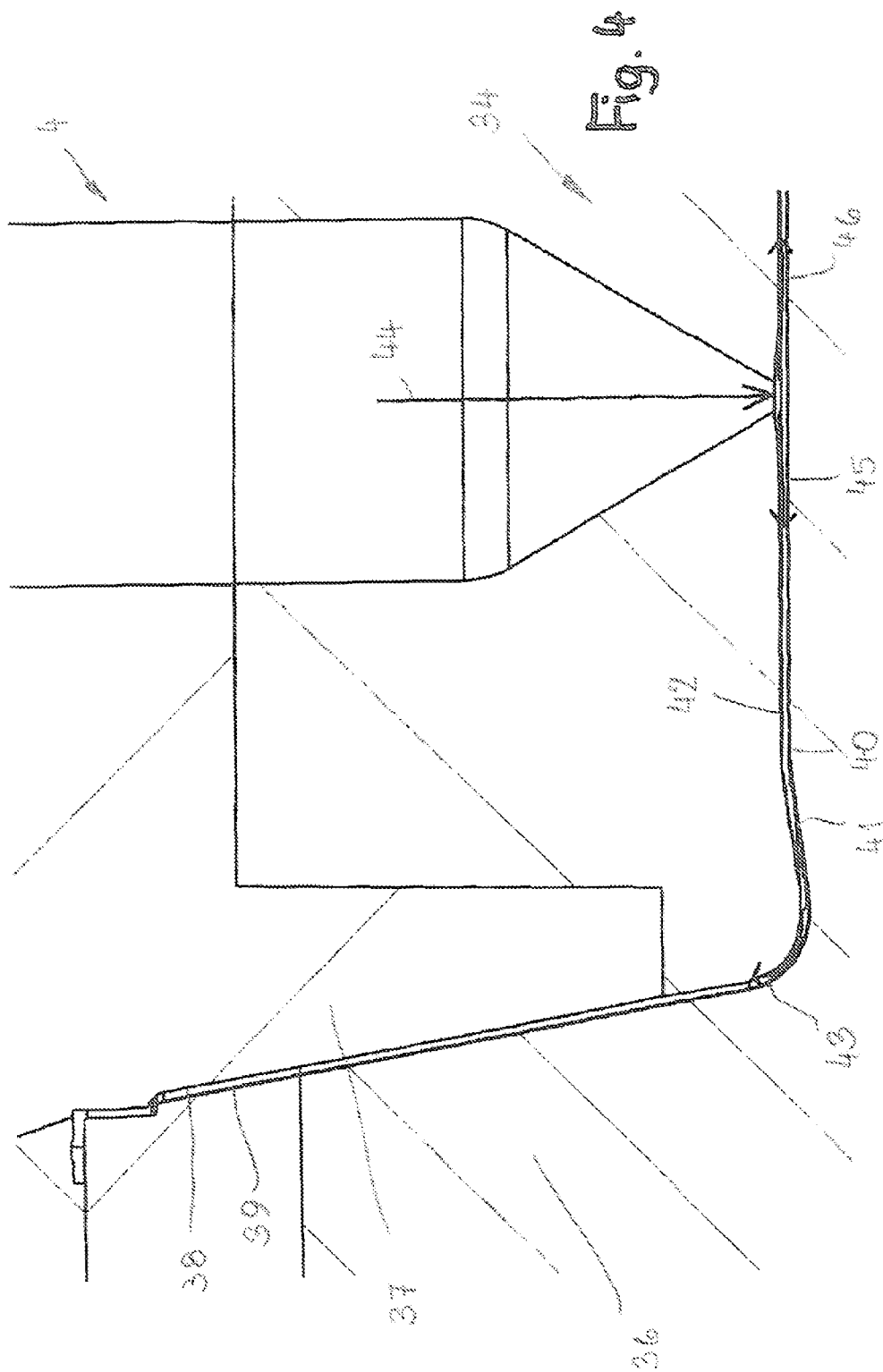

INSERTION PLUNGER AND METHOD FOR INSERTING WRAP-AROUND LABELS AND CONTAINER BOTTOM LABELS INTO AN INJECTION MOLD

BACKGROUND OF THE INVENTION

The invention relates to an insertion plunger for placement of at least one wrap-around label and at least one container bottom label into an injection mold for producing plastic containers. The invention further relates to a method for inserting a wrap-around label and a bottom label into an injection mold, wherein the labels are positioned in the injection mold by means of an insertion plunger.

It is known to produce plastic containers such that at least one part of the sidewall and the bottom of the container are formed by a wrap-around label as well as a bottom label. The plastic material for producing the plastic container is integrally molded onto these labels. These labels are placed into the injection mold. For this purpose, an insertion plunger is employed that comprises two holding parts positioned adjacent to each other and spaced apart from each other. One holding part is used for the wrap-around label and the other holding part for the bottom label. This insertion plunger is first moved toward the injection mold and is subsequently lowered so that the first holding part can place the wrap-around label into the injection mold. Subsequently, the insertion plunger is returned so that the first holding part is removed from the injection mold. Subsequently, the insertion plunger is moved so far relative to the injection mold that the second holding part is lowered into the injection mold in order to now transfer the bottom label to the injection mold. The insertion method employing such an insertion plunger is very time-consuming so that the output of the injection molding system is relatively low with such a system.

SUMMARY OF THE INVENTION

It is an object of the present invention to configure the insertion plunger and the method of the aforementioned kind in such a way that the wrap-around label and the bottom label can be inserted in a short period of time into the injection mold.

In accordance with the present invention, this is achieved in that the insertion plunger has an outer plunger and an inner plunger that is movable relative to the outer plunger.

The insertion plunger according to the invention is thus characterized in that it is provided with an outer plunger in which the inner plunger is movably supported relative to the outer plunger. In this way, not only a very compact configuration of the insertion plunger is provided but also a transfer of the wrap-around label and of the bottom label into the injection mold can be done in a time-saving way. Because of the relative movability of the inner plunger relative to the outer plunger it is possible, with a single stroke, to move the insertion plunger into the injection mold and to transfer the wrap-around label and the bottom label.

Advantageously, the outer plunger has securing means, for example, vacuum bores, for securing the wrap-around label.

The inner plunger of the insertion plunger according to the invention is provided with a securing device, preferably comprising at least one suction means, with which the bottom label is secured.

In order for the inner plunger to be able to perform a stroke relative to the outer plunger, it is movable by means of a drive.

A very simple configuration results when the inner plunger is loaded in the direction of a starting position, preferably by being spring-loaded. In this way, the inner plunger, after the transfer of the bottom label into the injection mold, is returned into the starting position. Advantageously, at least one pressure spring is used that automatically returns the inner plunger into the starting position after label transfer.

It is advantageous when the movement of the inner plunger relative to the outer plunger is limited.

It is advantageous when the stroke or displacement travel of the inner plunger is limited by a stop. In this way, a problem-free transfer of the bottom label to the injection mold is ensured.

It is especially advantageous when the outer plunger is provided with at least one stop that is positioned within the movement path of the inner plunger. When the inner plunger contacts the stop, a further extension movement of the inner plunger is no longer possible.

A particularly simple and reliable configuration of the insertion plunger results when the outer plunger is provided with at least one axially acting guiding element for the inner plunger. In this way, the inner plunger can be moved reliably into its transfer position.

The object of the present invention is further solved with respect to the method in that the wrap-around label and the bottom label are inserted with a single stroke of the insertion plunger into the injection mold.

According to the present invention, both labels are held by the insertion plunger when it is moved into the injection mold. In this way, with a single stroke the wrap-around label as well as the bottom label can be inserted or placed into the injection mold.

Advantageously, after insertion into the injection mold first the wrap-around label is transferred by the insertion plunger to the injection mold. Subsequently, by means of an extension movement of the inner plunger relative to the outer plunger the bottom label is transferred to the injection mold.

In this connection, it is particularly advantageous when the insertion plunger inserts the labels in such a way into the injection mold that the bottom label overlaps the wrap-around label on its inner side. In this way it is ensured that during the injection molding process no plastic material will escape to the exterior side of the labels or container.

BRIEF DESCRIPTION OF THE DRAWING

FIG. 2 is a section of the insertion plunger according to the invention in a first position.

FIG. 3 shows the insertion plunger in an illustration according to FIG. 2 in a second position.

FIG. 4 is a schematic illustration of injecting the plastic material into the injection mold with inserted wrap-around label and inserted bottom label.

DESCRIPTION OF THE PREFERRED EMBODIMENTS

Figure 1:
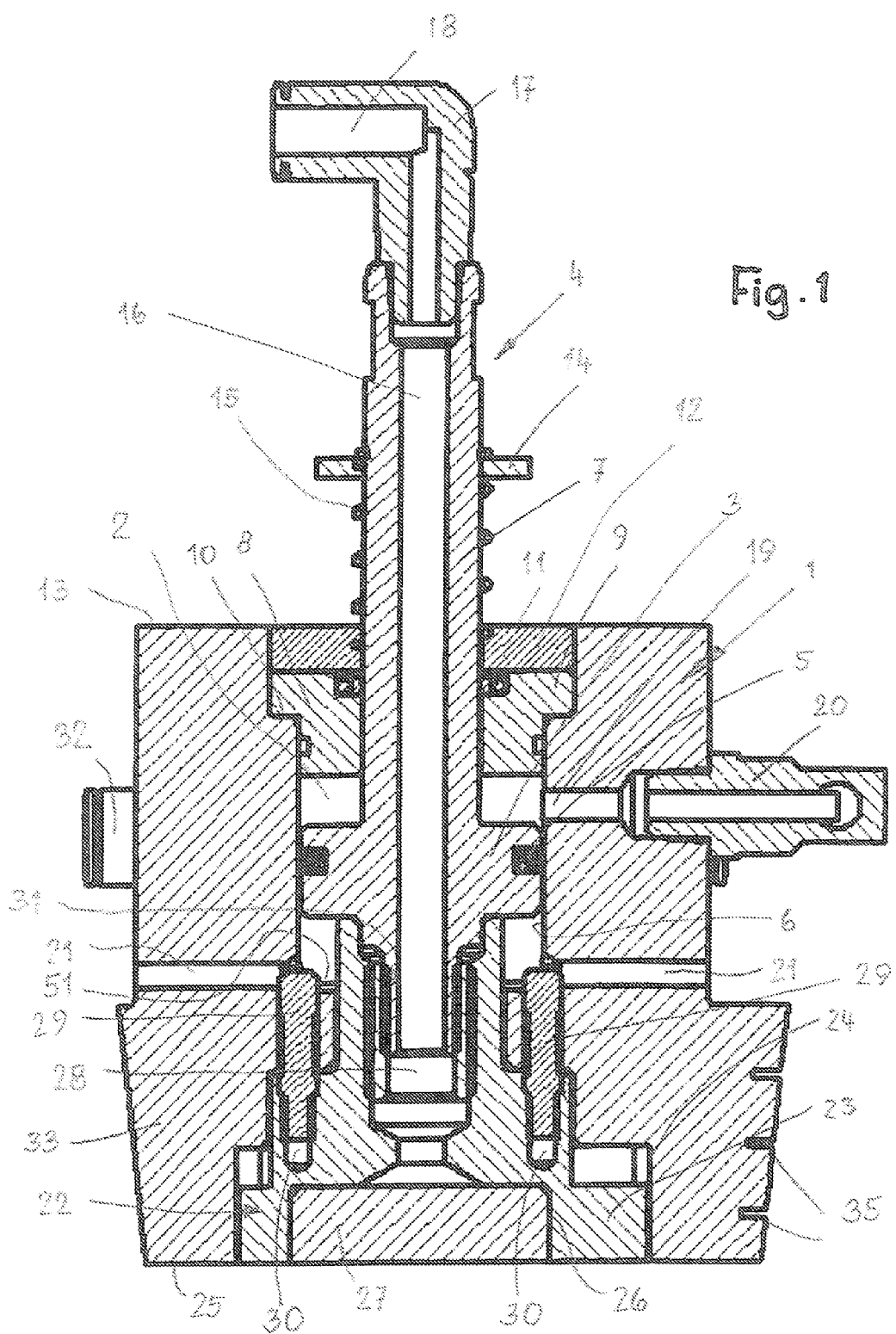
FIG. 1 is a section view of the insertion plunger according to the invention.

With the insertion plunger described in the following, in a single-step placement or insertion method cups of plastic material can be produced which plastic cups are provided with a bottom label and a wrap-around label. The insertion plunger is designed such that the labels are inserted in such a way into the injection mold that the injected plastic material cannot pass or escape to the exterior between the wrap-around label and the bottom label.

The insertion plunger 4 comprises an outer plunger 1 that comprises a pressure compartment 2 in which a piston 3 is slidably arranged in a seal-tight manner. The piston 3 is a component of an inner plunger 7 that projects from the outer plunger 1. The piston 3 is provided on its circumference with at least one seal 5 with which the piston 3 rests seal-tightly against the inner wall 6 of the pressure compartment 2. The piston 3 acts as a drive for the inner plunger 7.

The pressure compartment 2 is closed at the upper end where the inner plunger 7 exits by a lid 8 that is inserted into the outer plunger 1. It has a widened rim 9 with which it rests on a radial shoulder 10 of the inner wall 6 of the pressure compartment 2. The lid 8 that is penetrated by the inner plunger 7 is provided on the inner side with an annular seal 11 that rests seal-tightly against the outer side of the inner plunger 7. The lid 8 is attached in a suitable way in the outer plunger 1 and is recessed into recess 12 provided on the topside 13 of the outer plunger 1.

Outside of the outer plunger 1 there is a spring plate 14 that is axially fixedly connected to the inner plunger 7. The end of at least one pressure spring 15 is support on the spring plate 14. The spring 15 is embodied in the illustrated embodiment as a coil pressure spring and surrounds the inner plunger 7. The lower end of the pressure spring 15 in FIG. 1 is supported on the lid 8. By means of the pressure spring 15 the inner plunger 7 is loaded in the upward starting direction.

The inner plunger 7 is axially penetrated by a vacuum bore 16. Into the upper end of the inner plunger 7 a vacuum connector 17 is inserted, preferably screwed in. It is, for example, embodied as an angled member and has a supply bore 18 that opens into the vacuum bore 16 of the inner plunger 7.

Near the bottom side of the lid 8 at least one compressed air bore 19 opens into the pressure compartment 2 to which is connected a compressed air connector 20 provided on the outer side of the outer plunger 1. By means of the compressed air connector 20 compressed air is introduced into the pressure compartment 2 when the piston 3 and thus also the inner plunger 7 are to be moved downwardly against the force of the pressure spring 15.

In the area below the piston 3 at least one venting bore 21 opens into the pressure compartment 2 that connects the pressure compartment 2 with the atmosphere.

The pressure compartment 2 in the outer plunger 1 is delimited in the downward direction by a suction means holder 22 that is inserted from below into the outer plunger 1. The suction means holder 22 has a lower rim 23 of greater diameter than the remainder of holder 22; this lower rim 23 rests at the inner wall of a recess 24 that opens at the bottom side 25 of the outer plunger 1. Centrally the suction means holder 22 has on its bottom side a recess 26 into which is inserted a suction means 27. It may be, for example, a suction head array or a bellows suction head.

Into the recess 26 a through opening 28 opens that is of a significantly narrower diameter and provided axially in the suction means holder 22; its axis is aligned with the axis of the vacuum bore 16 of the inner plunger 7.

The suction means holder 22 is supported in the outer plunger 1 so as to be moveable to a limited extent in axial direction. For guiding the suction means holder 22 guiding elements 29 are provided that are distributed about the circumference and are preferably in the form of guide bolts. They extend axially within the outer plunger 1 and engage axially extending guide bores 30 in the suction means holder 22.

The guide bolts 29 project also into the pressure compartment 2 and may form stops for the piston 3 in its lower position (FIG. 2). The stop for of the piston 3 is advantageously formed by the bottom 51 (FIG. 1) of the pressure compartment 2. The inner plunger 7 projects with its end section 31 into the suction means holder 22 and is axially fixedly connected thereto in a suitable way.

The outer plunger 1 has at least one vacuum connector 32 that is shown in an exemplary fashion at the level of the pressure compartment 2 on the exterior side of the outer plunger 1.

The outer plunger 1 has a terminal section 33 that has an enlarged contour relative to the remainder; the insertion plunger is inserted with this terminal section 33 into the injection mold 34 (FIG. 2 and FIG. 3). On the circumference of this terminal section 33 there is a securing device in the form of vacuum bores 35 distributed about the circumference and about the vertical extension; by means of the bores 35 a wrap-around label 39 is secured on the section 33. Depending on the shape of the injection-molded cup, the terminal section 33 can have a conical or cylindrical shape. The terminal section 33 can have a circular cross-section but, depending on the container to be injection-molded, can also have a contour that is not round or is angular (polygonal).

Since the inner plunger 7 is slidable relative to the outer plunger 9 to a limited extent, with a one-step insertion method the wrap-around label 39 and the bottom-label 42 for the cup to be injection-molded can be inserted into the injection mold 34.

FIG. 4 shows a part of the injection mold with a bottom die 36 and a core 37 that delimits together with the bottom die 36 an injection space 38 into which the plastic material is injected for producing the container. On the wall of the injection space 38 the wrap-around label 39 is resting. At the lower end, the label 39 extends down to the bottom 40 of the injection space 38. The lower edge of the wrap-around label 39 is indicated at 41. The lower area of the wrap-around label 39 is overlapped by a bottom label 42 that is resting on the bottom 40 of the injection space 38 and with its outer edge 43 extends to the sidewall of the injection space 38, as shown in FIG. 4.

The plastic material is injected in the direction of arrow 44 centrally at the bottom area of the injection space 38. The plastic material is distributed in all directions across the bottom 40 as is indicated by the flow arrows 45, 46. The plastic material is distributed on the inner side of the bottom label 42 and the inner side of the wrap-around label 39. Since the bottom label 42 overlaps the wrap-around label 39 on the inner side, the plastic material cannot exit or escaped to the outer side of the container to be injection-molded so that the container can be injection-molded properly.

FIG. 3 shows the insertion plunger 4 in its starting position. About the circumference of its terminal section 33 the wrap-around label 39 is secured by means of vacuum bores 35 by a vacuum. The inner plunger 7 is pushed by the spring force so far upwardly that the guide bolts 29 are resting against the bottom 47 of guide bores 30 of the suction means holder 22. In this position, the piston 3 is spaced from the bottom side 48 of the lid 8.

First, the bottom label 42 is placed against the bottom side of the insertion plunger 4 and is secured by securing device in the form of the suction means holder 22 of the inner plunger 7. The bottom side 49 of the suction means holder 22 is positioned in this starting position of the inner plunger 7 in a common plane with the bottom side 50 of the outer plunger 1. Subsequently, the wrap-around label 39 is placed onto the insertion plunger 4 and by means of the vacuum that is acting through the vacuum bores 35 is secured on the outer wall of the terminal section 33. Since first the bottom label 42 and only subsequently the wrap-around label 39 are positioned on the insertion plunger 4, the inward overlap of the wrap-around label 39 by the bottom label 42 is ensured.

After placement of both labels 39, 42, the insertion plunger 4 is advanced toward and then moved into the injection mold. In the injection mold 34 the wrap-around label 39 is transferred that is secured on the inner wall of the injection space 38 by means of vacuum. This situation is illustrated in FIG. 3.

Subsequently, the inner plunger 7 is moved down relative to the outer plunger 1 to such an extent (FIG. 2) that the bottom label 42 can be placed onto the bottom 40 of the insertion space 38. The bottom 40, as is conventional in the art, is provided with vacuum openings so that the bottom label 42 by means of the applied vacuum is secured on the bottom 40. After transfer of the two labels 39, 42 the vacuum in the insertion plunger 4 is canceled so that the insertion plunger 4 subsequently can be moved out of the injection mold 34 while the labels 39, 42 remain secured in the injection mold 34. Subsequently, the injection mold 34 can be closed and plastic material can be injected in the described way.

Since for insertion of the two labels 39, 42 into the injection mold 34 only one stroke of the injection plunger 4 is required, a very short tool (mold) engagement time results so that within a given time unit a high number of injected containers can be produced. Despite this short tool engagement time, the containers are injection-molded in a reliable fashion. In particular, no plastic material will escape to the exterior of the container.

Aside from using compressed air, the piston 3 of the inner plunger 7 can be moved, for example, also by a hydraulic medium or by mechanical moving devices. Aside from using vacuum, the two labels 39, 42 can also be secured, for example, by means of static charging of the insertion plunger 4 and/or in the injection mold 34.

The venting bores 21 ensure that the piston 3 upon being pressure loaded is pushed reliably downwardly. The maximum stroke of the piston 3 is achieved when it contacts the end face of the guide bolt 29 (FIG. 2). As a result of this additional stroke, the suction means holder 22 moves downwardly and partially out of the recess 24 in the end section 3 of the outer plunger 1.

After transfer of the labels 39, 42 the pressure compartment 2 is pressure-relieved. The piston 3 is then returned by the force of the pressure spring 7 into the starting position according to FIG. 3 so that the next labels 39, 42 can be received. This return of the inner plunger 7 into the starting position is realized already during removal of the insertion plunger 4 from the injection mold 34. In this way, the cycle times between sequential insertion processes can be very short.

The drive action of the inner plunger 7 can be embodied in various ways. For example, an externally positioned pneumatic cylinder, an externally positioned hydraulic cylinder, an electric linear drive, a servo drive with spindle, and the like can be employed.

Instead of the restoring spring 15 also a double-acting cylinder or a similar device can be used. In this case, the piston 3 is loaded on one or the other side, depending on the displacement direction of the inner plunger 7.

For the inner plunger 7, not only any type of drive technology for the stroke can be used but also any suitable stroke limitation. For example, a mechanical stop, a tool (mold) as a counter stop, a stroke limitation by a servo drive or electric linear drive can be employed.

The specification incorporates by reference the entire disclosure of German priority document 10 2009 059 039.0 having a filing date of Dec. 11, 2009.

While specific embodiments of the invention have been shown and described in detail to illustrate the inventive principles, it will be understood that the invention may be embodied otherwise without departing from such principles.

What is claimed is:

1. A method for insertion of a wrap-around label and a bottom label that is separate from the wrap-around label into an injection mold, wherein the wrap-around and bottom labels are inserted by an insertion plunger, the method comprising:
   a) securing the bottom label on a bottom side of an inner plunger of the insertion plunger;
   b) securing the wrap-around label on a circumference of an outer plunger of the insertion plunger;
   c) inserting the wrap-around label and the bottom label in a single stroke performed by the insertion plunger into the injection mold;
   d) first transferring the wrap-around label into the injection mold; and
   e) subsequently transferring the bottom label into the injection mold by moving the inner plunger relative to the outer plunger farther into the injection mold.

2. The method according to claim 1, wherein in the step b) the warp-around label is secured such that the bottom label overlaps the wrap-around label on the inner side of the wrap-around label.

3. The method according to claim 1, wherein in the step e) the bottom label is transferred in such a way into the injection mold that the bottom label overlaps the wrap-around label on the inner side of the wrap-around label.

* * * * *